US009160719B2

(12) United States Patent
Marlow et al.

(10) Patent No.: US 9,160,719 B2
(45) Date of Patent: Oct. 13, 2015

(54) HIDING CIPHERTEXT USING A LINGUISTICS ALGORITHM WITH DICTIONARIES

(71) Applicant: Protected Mobility, LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US); Anthony Fascenda, Rockville, MD (US)

(73) Assignee: PROTECTED MOBILITY, LLC, Rockville, MD (US)

( * ) Notice: Subject to any disclaimer, the term of this patent is extended or adjusted under 35 U.S.C. 154(b) by 25 days.

(21) Appl. No.: 13/947,186

(22) Filed: Jul. 22, 2013

(65) Prior Publication Data
US 2014/0025952 A1    Jan. 23, 2014

Related U.S. Application Data

(60) Provisional application No. 61/674,254, filed on Jul. 20, 2012.

(51) Int. Cl.
*H04L 29/06*    (2006.01)
(52) U.S. Cl.
CPC .................................. *H04L 63/0428* (2013.01)
(58) Field of Classification Search
CPC .................................................. H04L 63/0428
USPC ........................................................ 713/168
See application file for complete search history.

(56) References Cited

U.S. PATENT DOCUMENTS

| | | |
|---|---|---|
| 5,592,555 A | 1/1997 | Stewart |
| 6,125,281 A | 9/2000 | Wells et al. |
| 6,356,937 B1 | 3/2002 | Montville et al. |
| 7,076,657 B2 | 7/2006 | Koukoulidis et al. |
| 7,424,615 B1 | 9/2008 | Jalbert et al. |
| 7,702,898 B2 | 4/2010 | Tan |
| 8,064,606 B2 | 11/2011 | Schuba et al. |
| 8,386,800 B2 | 2/2013 | Kocher et al. |
| 8,464,061 B2 | 6/2013 | Bradley |
| 2002/0123967 A1 | 9/2002 | Wang |

(Continued)

FOREIGN PATENT DOCUMENTS

WO    01/95558 A1    12/2001

OTHER PUBLICATIONS

Hiding the Hidden: A Software System for Concealing Ciphertext as Innocuous Text. Mark T. Chapman The University of Wisconsin-Milwaukee, 1998 Under the Supervision of Professor G. I. Davida.*

(Continued)

*Primary Examiner* — Kambiz Zand
*Assistant Examiner* — Benjamin Kaplan
(74) *Attorney, Agent, or Firm* — Nixon & Vanderhye P.C.

(57) ABSTRACT

Encrypted communications is made to appear to be normal text so as to avoid undue attention to either the sender or recipient. Information can be hidden or embedded in innocuous documents using steganography wherein the information is masked within a larger document. Other approaches would translate the ciphertext into a form of normal looking text that would in effect be gibberish but would use normal words in at least one native language. There are many tradeoffs and benefits to be considered when attempting any form of encrypted communications.

20 Claims, 9 Drawing Sheets

(56) References Cited

U.S. PATENT DOCUMENTS

| | | |
|---|---|---|
| 2002/0141591 A1* | 10/2002 | Hawkes et al. ............... 380/278 |
| 2003/0078058 A1 | 4/2003 | Vatanen et al. |
| 2004/0171369 A1 | 9/2004 | Little et al. |
| 2005/0081054 A1 | 4/2005 | Choo |
| 2005/0232422 A1 | 10/2005 | Lin et al. |
| 2006/0158460 A1 | 7/2006 | Uh |
| 2006/0246956 A1 | 11/2006 | Park et al. |
| 2007/0022295 A1 | 1/2007 | Little et al. |
| 2007/0072564 A1 | 3/2007 | Adams |
| 2007/0083766 A1 | 4/2007 | Farnham et al. |
| 2007/0180230 A1 | 8/2007 | Cortez |
| 2007/0180540 A1 | 8/2007 | Little et al. |
| 2007/0185815 A1 | 8/2007 | Boccon-Gibod et al. |
| 2008/0172730 A1* | 7/2008 | Sandhu et al. .................... 726/9 |
| 2008/0313458 A1 | 12/2008 | Fascenda et al. |
| 2009/0055643 A1 | 2/2009 | Brown et al. |
| 2009/0169013 A1 | 7/2009 | Fascenda et al. |
| 2009/0185677 A1 | 7/2009 | Bugbee |
| 2009/0228707 A1 | 9/2009 | Linsky |
| 2009/0265552 A1 | 10/2009 | Moshir et al. |
| 2009/0268902 A1 | 10/2009 | Fascenda et al. |
| 2009/0287930 A1 | 11/2009 | Nagaraja |
| 2010/0020972 A1 | 1/2010 | Baugher et al. |
| 2010/0159962 A1 | 6/2010 | Cai et al. |
| 2011/0117883 A1 | 5/2011 | Drabo |
| 2011/0138170 A1 | 6/2011 | Fascenda et al. |
| 2011/0138172 A1 | 6/2011 | McCreight et al. |
| 2011/0194695 A1 | 8/2011 | Fascenda et al. |
| 2011/0225417 A1* | 9/2011 | Maharajh et al. ............. 713/150 |
| 2012/0054493 A1 | 3/2012 | Bradley |
| 2012/0239417 A1 | 9/2012 | Pourfallah et al. |
| 2012/0239560 A1 | 9/2012 | Pourfallah et al. |
| 2012/0290809 A1 | 11/2012 | Little et al. |
| 2012/0300932 A1 | 11/2012 | Cambridge et al. |
| 2012/0308001 A1 | 12/2012 | Arnold et al. |
| 2013/0030828 A1 | 1/2013 | Pourfallah et al. |
| 2013/0268437 A1 | 10/2013 | Desai et al. |

OTHER PUBLICATIONS

Lisonek, David, et al., "SMS Encryption for Mobile Communication," 2008 International Conference on Security Technology, IEEE Computer Society, Dec. 2008, SecTech.2008.48, pp. 198-201.

* cited by examiner

HIDING CIPHERTEXT USING A LINGUISTICS ALGORITHM WITH DICTIONARIES

CROSS-REFERENCE TO RELATED APPLICATION

Priority is claimed from U.S. Provisional Application No. 61/674,254 filed Jul. 20, 2012, incorporated by reference.

STATEMENT REGARDING FEDERALLY SPONSORED RESEARCH OR DEVELOPMENT

Not Applicable.

FIELD

The technology herein relates to computer security, and more particularly to secure messaging. Still more particularly, the technology herein provides for the obfuscation of encrypted information moved between two parties.

BACKGROUND AND SUMMARY

With the proliferation of inexpensive handheld communications devices such as mobile phones, texting has become a popular way to communicate. Based on the "Short Message Service" ("SMS") standardized by GMS wireless telephone network carriers worldwide since the mid-1980's, texting involves sending a message containing a maximum, relatively small number of characters (for example, 140 bytes or 160 7-bit characters in one non-limiting scenario) per message based on standard alphabets. Other data messaging services such as Twitter similarly constrain message length e.g., to 140 characters. Certain other messaging standards such as MMS permit transmission of a variety of other data such as multimedia.

Short messaging offers numerous advantages in terms of transport efficiency, succinctness and convenience, but there can be problems with security. Most short messages are sent and received in unsecured form. Interception by unauthorized people and spoofing are two of the problems that can arise from insecure short messaging. Hacking of insecure text messaging has caused numerous high-profile scandals and information leaks. Additionally, texting could be a valuable tool for law enforcement, the military and other government agencies if adequate end-to-end security could be provided.

While it would be highly desirable to secure short messaging, there are challenges to doing so. In particular, the short length, insecurity of the communications networks used to transport the messages and the relatively low processing power available on many devices commonly used to exchange short messages all present obstacles to introducing secure SMS or other secure short messaging.

Most secret or secure messaging is based on the concept of a "shared secret" that only the sender and receiver know. Such a shared secret can be a code book, a cryptographic key for the day or the session, a pseudorandom cryptographic key generated independently by each of the sender and the receiver based on shared "seed" data, or a variety of other mechanisms.

The output of a strong cryptographic process based on the aforementioned "shared secret", is potentially a stream of information that is unintelligible, unless one has access to the keys used to encode the data. For example, the message "The lazy fox jumped over the brown dog" when encrypted might appear as something like "PGPÁÁN {53¢ ¢æó ÿl,0 'ã"FEã+ ‡yø°ê¾Ëœ‡ CoÏ%T+Ò¬?+ÿ/[t ò ~"". Such an encrypted message—which does not appear to be any natural language and thus discloses to any reviewer that it is a "machine" or coded construct rather than a natural communication between two human beings—cannot be converted into intelligible form except by someone with appropriate decryption software/algorithm and a secret and/or shared decryption key.

In some contexts, sending a stream of undecipherable information that resembles no natural language in common use today may itself may be a tip off that an encryption process is being used, especially if one is using a communications medium that is rarely encrypted. For instance, if one is sending a textual based message via SMS, intervening systems between the communicating peers may be set up to scan for certain patterns of data or words. Since the encrypted stream may not appear to fit within acceptable parameters of potential listening parties or devices, the encrypted data stream may be flagged for additional analysis or disallowed altogether, ultimately alerting other entities to the fact the peers are communicating in a secure fashion. An attacker might be able to look for messages whose content indicates it has been encrypted, and concentrate on trying to break them—or apply so-called "traffic analysis" techniques to the encrypted messages in an attempt to learn something about the sender, the receiver or the messages they are exchanging. As one example, the mere knowledge that a secure message has been sent at a certain time from a certain place may in itself be valuable information even if the message content has not been exposed or decrypted.

Those skilled in the art are aware of so-called "steganography" ("hidden writing") for hiding messages. Steganography is commonly understood to be the practice of hiding a message or picture, often within a larger message or picture. A picture that contains an embedded message or picture can often be indistinguishable to even the most sophisticated user. For example, during WWII, spies photographically created miniature messages in the form of "microdots" that were then adhered to ordinary documents such as newspapers or typewritten letters. The microdots masqueraded as periods or other punctuation marks in these ordinary documents. Other more ancient examples of hiding messages include writing on wooden tablets that are then covered by wax, and the use of invisible inks.

There are more modern, computer age examples of steganography. For example, it is known to hide a message within a color image. A color picture as stored and processed by computer is typically encoded as an RGB image with each pixel in the image (consisting of the three colors (Red, Blue and Green)) represented by an eight-bit number. Replacing the low-order bit of each of the three colors with a bit representing a bit of the desired text to be hidden will make virtually no change to the image as seen by a user. Another known but more complex steganography technique alters the relationship between the Discrete Cosine Transform (DCT) coefficients in a compressed (e.g., JPEG) image in a way that encodes a hidden message.

Steganographic techniques are also commonly used to embed watermarks or copyright information. Such techniques can be used to watermark audio and video files. Basically, today, anything in the digital age can be watermarked. Individual watermarking, for instance, can be used in a forensic analysis to provide an audit trail of where a pirated video originally came from.

A discussion of the techniques of steganography can be found in Stefan Katzenbeisser's book "Information Hiding Techniques for Steganography and Digital Watermarking" (Artech House 2000), incorporated herein by reference. The book discusses many of the aspects of information hiding. It surveys recent research results in the fields of watermarking and steganography, two disciplines generally referred to as information hiding. The book begins with an introduction to the field of information hiding, discussing the history of steganography and watermarking and possible applications to modern communication systems. Katzenbeisser introduces a model for steganographic communication (the 'prisoners problem') and discusses various steganographic protocols such as pure steganography, secret key steganography, public key steganography and supraliminal channels). He further discusses several information hiding methods useable for steganographic communication, among them substitution systems, hiding methods in two-color images, domain transform techniques, statistical steganography, distortion and cover generation techniques. In the steganalysis section, Neil F. Johnson introduces the concepts of steganalysis—the task of detecting and possibly removing steganographic information. Included is also an analysis of common steganographic tools.

Further in the book, an introduction to watermarking techniques and the requirements and design issues for watermarking software is discussed. A survey of current watermarking techniques presents several design principles for watermarking systems, among them the choice of host locations, psychovisual aspects, the choice of a workspace (DFT, DCT, wavelet), the format of the watermark bits (spread spectrum, low-frequency watermark design), the watermark insertion operator and optimizations of the watermark receiver.

The robustness of copyright marking systems is discussed along with the issue of watermark robustness to intentional attacks. The chapter includes a taxonomy of possible attacks against watermarking systems, among them protocol attacks like inversion, oracle attacks, limitations of WWW spiders and system architecture issues.

A chapter on fingerprinting discusses principles and applications of statistical fingerprinting, asymmetric fingerprinting and anonymous fingerprinting. Copyright on the Internet and watermarking is finally discussed and watermarking systems from a legal point of view and addresses various other aspects of copyright law on the Internet.

Obviously, there is considerable art in place for steganography. One such use of steganography is "Digimarc for Images". This particular method is often available to end users in photo editing applications such as Photoshop. Digimarc allows the user to watermark a photo with embedded attributes such as "do not copy", "adult content" etc. This information is passed along within the picture. Other software that is used to copy, print or view the image can utilize the embedded information to restrict a user's right to the picture.

The above technique can effectively hide a message or picture in a larger picture at a ratio of 8:1 and is thus inefficient for most information. Every time a user would want to send a steganographic text message, for example, a user would be sending thousands of bytes in the form of an image just to send a few bits of "payload" information. It may also be deduced by an adversarial party that the user's predilection to sending pictures was in fact a method to mask the true meaning of the communications.

Thus, it is not readily apparent how steganography could be used to hide SMS ciphertext.

We have determined that, in certain circumstances such as SMS or other short messaging, it would be desirable to further encode the enciphered data into another format that disguises the fact that the message was encrypted in the first place.

The exemplary illustrative non-limiting technology herein provides non-limiting steganographic processes and algorithms that allow for a lightweight peer-to-peer exchange of disguised cryptographic information masquerading as unencrypted natural language messages over insecure communications links.

The exemplary illustrative non-limiting light-weight technology herein can be used to implement secure technology using a small amount of computational power of the type available on low-cost portable, mobile or any other end-to-end devices (e.g., any embedded processing technology) and within limited message length constraints. For example, the exemplary illustrative non-limiting technology provides a reduced or minimal message encapsulation having low consumption of available message payload.

In simple terms, an illustrative algorithm can be used to obfuscate encrypted data content in SMS, Twitter or other short messaging. Furthermore, this technology can be used to disguise or pass off as natural language messages, any message oriented communications such as MMS, picture messages, email messages, other text documents/attachments, command and control messages, alerts messages, machine to machine messages, etc. on a variety of platforms.

Alternatively or in addition, rather than adhering to any particular standardized dictionary, dictionaries and/or text transformation algorithms used to convert enciphered text into text masquerading as natural language messaging can be employed that convert enciphered text to non-standard abbreviated or otherwise stylized text that is, to all but highly specialized human and/or machine analysis, essentially or substantially indistinguishable from commonly used texting vernacular in common use by modern texters such as teenagers. Since many natural language vernacular texts composed by teenagers will be gibberish to most adults and to any machine processes trained or programmed to recognize standard English, in addition or alternatively, the non-limiting techniques used herein can take advantage of the proliferation of a non-standard texting vernacular that defies analysis by standardized machine spell and grammar checking to provide text transformations yielding outputs that are statistically and/or otherwise indistinguishable from such texting vernacular in terms of word order (or lack thereof), misspellings, abbreviations, lack of punctuation, general style and other characteristics.

One example non-limiting target platform with which the present technology can be useful is RIM's Blackberry devices, Apple iPhones and iPads, Google Android based devices or any desired SMS or other short or other messaging platforms.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 4 shows a non-limiting exemplary command line computer program that encodes electronic information using an non-limiting illustrative dictionary embodiment;

FIG. 5 shows a non-limiting exemplary command line computer program that decodes electronic information using an non-limiting illustrative dictionary embodiment;

FIG. 6 shows a non-limiting exemplary command line computer program that encodes electronic information using an non-limiting illustrative dictionary embodiment;

DETAILED DESCRIPTION

Example Non-Limiting Methodology

Figure 1:
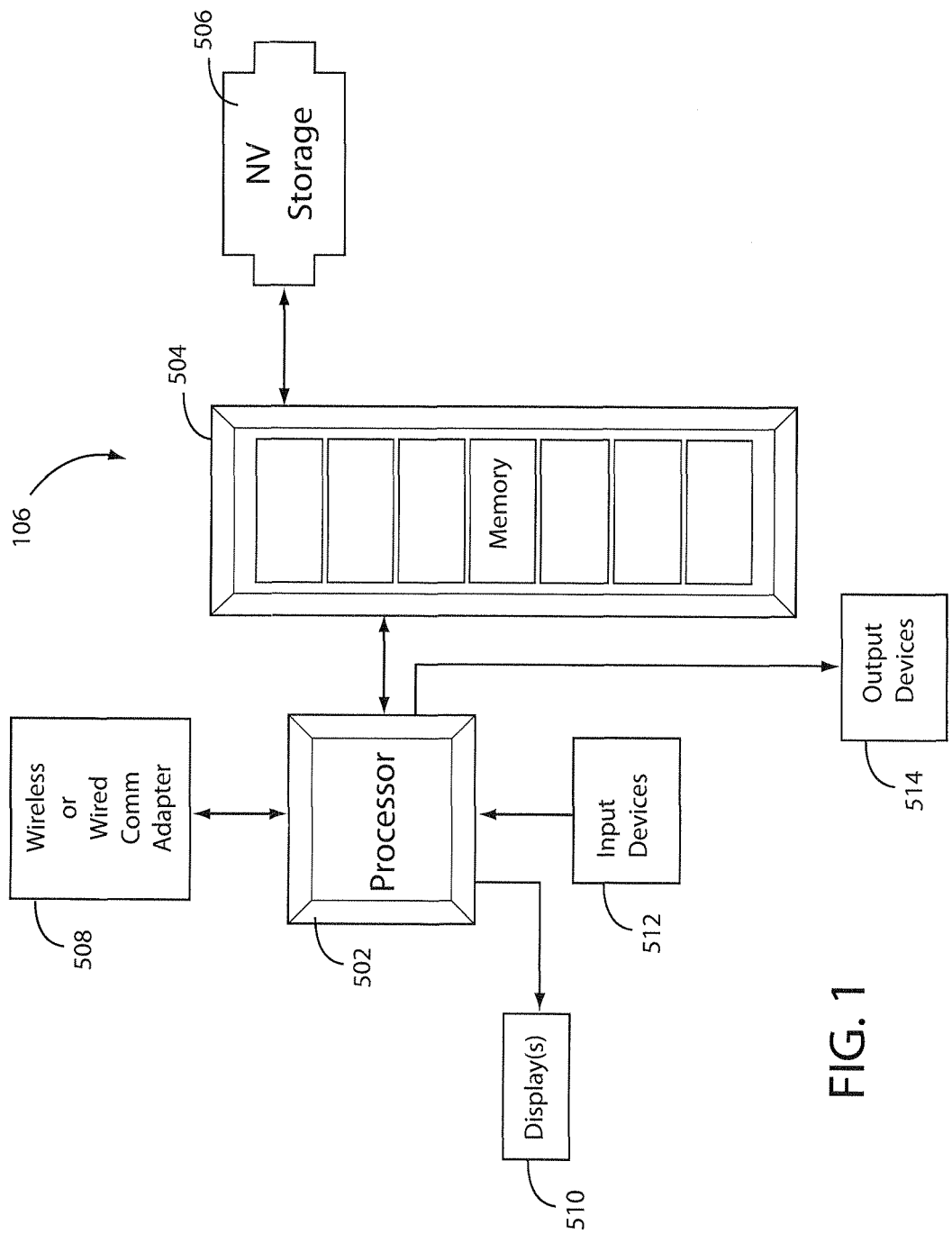
FIG. 1 shows an example non-limiting hardware architecture.

In one example implementation, there are several steps between plaintext and possible secure messaging:
1) Initial Plaintext—traditional SMS mobile phone software implementation
2) Compression (optional) to reduce size of original message
3) Encryption
4) Encapsulation—used to make ciphertext easier for transport
5) Stealth Encoding—used to "hide in plain sight" the ciphertext
   a. Steganography—hiding the ciphertext within a normal looking document
   b. Dictionary Conversion—converting ciphertext to appear as normal text with sentence structure.

Each of the above steps can be considered from various perspectives before deciding on an optimal or useful implementation for a particular application, context and/or platform.

Current commercially available applications provide for the encryption of SMS messages between at least two communicating peers. Most applications don't include step 2 or step #5 listed above. At the origination point, the plain text is encrypted (Step #3) and the resulting ciphertext is then communicated to a peer system.

More sophisticated offerings will compress the plain text before encrypting and then encode the output cipher text using a standard printable ASCII encoding techniques such as Base64 (Step #4). Base64 encoding is widely used so that the binary data can be easily moved between an origin and at least one destination across the existing network infrastructure. In this illustrative example, while the resultant data stream is converted into a transportable ASCII format, it is readily apparent to the human eye that the ASCII text is the result of a computer program. Thus, the resultant encoded text streams can easily be detected by automatic scanners and are susceptible to unwanted attention.

To illustrate the use of Base64 encoding, here is an example of the process using a quote from Thomas Hobbes' Leviathan:

"Man is distinguished, not only by his reason, but by this singular passion from other animals, which is a lust of the mind, that by a perseverance of delight in the continued and indefatigable generation of knowledge, exceeds the short vehemence of any carnal pleasure."

Using standardized Base64 encoding techniques, the resultant output sequence of data is:
TWFuIGlzIGRpc3Rpbmd1aXNoZWQsIG5vdCBvbmx5IGJ5IGhpcyByZWFzb24sI GJ1dCBieSB0aGlzIHNpbmd1bGFyIHBhc3Npb24gZnJvbSBvdGhlciBhbmltYWxzL CB3aGljaCBpcyBhIGx1c3Qgb2YgdGhlIG1pbmQsIHRoYXQgYnkgYSBwZXJzZX ZlcmFuY2Ugb2YgZGV saWdodCBpbiB0aGUgY29udGludWVkIGFuZCBpbmRlZ mF0aWdhYmxlIGdlbmVyYXRpb24gb2Yga25vd2xlZGdlLCBleGNlZWRzIHRoZS BzaG9ydCB2ZWhlbWVuY2Ugb2YgYW55IGNhcm5hbCBwbGVhc3VyZS4="

In the above quote the encoded value of Man is "TWFu". Encoded in Base64 the letters, M, a, n are initially stored as the binary values of 77, 97, 110, which are 01001101, 01100001, 01101110 in base 2. These three bytes are joined together in a 24-bit buffer producing 010011010110000101101110. Packs of 6 bits (6 bits have a maximum of 64 different binary values) are converted into 4 numbers (24=4×6 bits), which are then mapped to their corresponding printable ASCII text value. In this case 010011 is mapped to the character "T", 010110 is mapped to character "W", 000101 is mapped to character "F", and 101110 is mapped to character "u".

Note, however, that the resultant illustrative example of Base64 data, while having the ability to pass through the network infrastructure, is barely distinguishable from an appearance standpoint as actual strongly encrypted cipher text data. In other words, it looks like a string of random characters with no sentence structure and no readable words in at least one native language. Even to an unsophisticated person, this is obviously encoded information at the most casual of glances.

It would be highly desirable to avoid being detected as ciphertext. In addition or alternatively, it would be highly desirable for the message to be ignored by automatic scanning software that looks for specific keywords. As anyone who has ever read Orczy's "The Scarlet Pimpernel" or watched Batman understands, hiding information in plain sight can sometimes be used to keep it confidential. The addition of a sophisticated stealth capability (step 5) would enable encrypted text messages to be communicated in such a way as to be 'hidden in plain sight' and not discernable for traditional text messages, given that billions of messages are communicated across many networks in a single day.

There are many methods of providing stealth capability. These fall into several categories from simple methods to more sophisticated hardware-intensive methods.
   Anonymous—encrypted messages are sent to a storage place and the recipient is notified that a message is waiting. No direct send of message to recipient. Hides identification of sender.
   Media distribution—messages are spread over the communications media and masked by natural noise of the channel
   Picture Steganography—messages are hidden within other innocuous pictures or messages
   Dictionary Translation—ciphertext is converted into plaintext with normal appearing sentence structure The goal of an example non-limiting sophisticated secure communications program is to not only protect the communications but to make it as invisible as possible to the trained eye. An example non-limiting method of passing private information from source to destination is preferably done between cooperating peers without using additional component or infrastructure support. Less moving parts, means less chance for adversarial parties access to the private information. Second, as shown in the examples above, hiding the private information in plain sight may be preferred in some example non-limiting implementations over the use of straight encryption, due to the ability of the adversarial parties to realize that encryption is being used in the first place.

There are example non-limiting steps that an application could take to further obfuscate or disguise the use of steganography techniques.
   First, rather than encoding every low-order bit in an image, a pre-defined mask could be used that tells the encoding and decoding applications which particular low-order pixels are being used to convey steganographic data.

Thus without knowing in advance the pixel map, the discovery of steganographic information could be made much more difficult.

Rather than modify a single low-order pixel in each color, the application could modify several of the surrounding pixels to match the particular desired low-order bit containing the bit to be transmitted thus making it much more difficult to detect. This would require the use of a pixel map.

The encoding application could use specific colors in a randomly generated pixel map according to a formula. For instance, the first encoded pixel if a "1" and the sum of the low order bits surrounding the encoded pixel could be used as a pointer to the next pixel to be encoded. A "modulos-3" method could be used to choose whether the next pixel to be encoded at that location uses the Red, Blue or Green pixel.

As shown, there are numerous mathematical transforms that can be used to mask the use of traditional steganography techniques.

Another alternative as previously enumerated, rather than converting the ciphertext using Base64, a dictionary method takes every 8 bits of ciphertext and uses those bits as a pointer into a dictionary composed of 256 randomly chosen words of varying lengths.

Each 8-bit value results in a table-lookup of a word from dictionary. The construction of the dictionary table consists of randomly chosen words of any particular length. The dictionary is accessible by the application for each cooperating peer. The optional ability for supporting multiple dictionaries such that different dictionaries can be selected based on time of use or potentially for each set of peers. Dictionaries, in a sense can provide a semblance of one-time cipher pads.

An alternative step in the Dictionary Technique is to transform the ciphertext output into readable text. Taking the previous example of text to be converted: "Man is", take each character and use the 8 bits as an index into a Dictionary table. Then take the resulting word from the dictionary and begin building a new message. In an example non-limiting implementation, the "Text Content" can be converted into ciphertext and the ciphertext would be used to index into the selected word dictionary. In one non-limiting illustrative example, the following is a list of 256 words appearing on the first pages of George Orwell's classic book "1984":
"It","was","a","bright","cold","day","in","April", "and","the","clocks","were","striking","thirteen","Winston", "Smith",
"his","chin","nuzzled","into","breast","an","effort","to","escape","vile","wind","slipped","quickly","through","glass","doors",
"of","Victory","Mansions","though","not","enough","prevent","swirl", "gritty","dust","from","entering","along","with","him","The",
"hallway","smelt","boiled","cabbage","old","rag","mats","At", "one","end","it","colored","poster","too","large","for",
"indoor","display","had","been","tacked","wall","depicted","simply", "enormous","face","more","than","meter","wide","man","about",
"forty","five","heavy","black","mustache","ruggedly","handsome","features", "made","stairs","no","use","trying","lift","Even","at",
"best","times","seldom","working","present","electric","current","cut", "off","during","daylight","hours","part","economy","drive","preparation",
"Hate","Week","flat","seven","flights","up","who","thirty", "nine","varicose","ulcer","above","right","ankle","went","slowly",
"resting","several","on","way","On","each","landing","opposite", "shaft","gazed","those","pictures","which","are","so","contrived",
"that","eyes","follow","you","when","move","BIG","BROTHER", "IS","WATCHING","YOU","caption","beneath","ran","voice","came",
"oblong","metal","plaque","like","dulled","mirror","formed","surface", "hand","Behind","Winston's","back","telescreen","still","babbling",
"away","pig","iron","overfulfillment","Ninth","Three","Year","Plan", "received","transmitted","simultaneously","Any","sound","level","very","low",
"whisper","would","be","picked","by","moreover","long","as", "he","remained","within","field","vision","commanded","could","seen",
"well","heard","There","course","knowing","whether","being","watched", "any","given","moment","How","often","or","what","system",
"Thought","Police","plugged","individual","wire","guesswork","even","conceivable", "they","everybody","all","time","But","rate","plug","your",
"whenever","wanted","You","live","did","habit","became","instinct", "assumption","every","overheard","except","darkness","movement","scrutinized","1984"

In this non-limiting illustrative example, the first letter "M" is represented as hexadecimal 0x4D (77 decimal). This value is used as the pointer into the Dictionary to retrieve the word "wide". The second character "a" is represented as hexadecimal value 0x61 (97 decimal). This is used as the index to the next word in the new message "times". The next character "n" is represented as hexadecimal value 0x6E (110 decimal). This is used as the index to the next word in the new message "drive". This process continues until all characters of the input message have been transcribed. The resulting message replaces the beginning of the string as follows:

Plaintext: "Man is"

Dictionary Technique: "widetimesdriveofduringseven"

To further make this text indistinguishable, the algorithm can add spaces, punctuation, etc. to further hide the intent of the text. The resultant message would appear as:

Dictionary Technique: "wide times drive of during seven"

This text, while it may not make much sense to a person who actually tries to read the message, is much better at masquerading as a natural language message than transmitting Base64 texts at least because it is not represented as an endless string of characters but rather appears to be actual words that are more recognizable. The next step would be to automatically generate individual sentence parameters such as how many words to a sentence, where to insert a comma, etc. Thus the resulting sentence might appear as:

"Wide times, drive of during seven"

This text would be perfectly readable English to anyone but essentially meaningless. It has normal plaintext characters, sentence structure and is entirely readable to anyone with average reading skill. More importantly, automatic, scanning programs looking for ciphertext or encoded messages or even keywords would have great difficulty in recognizing the Dictionary Technique output text as anything other than a plaintext message. In other words, the resulting text would be indistinguishable or substantially indistinguishable, to many automatic computer processes, from a natural language message written by a human.

Many text messages written by humans don't necessarily follow the standard grammatical and spelling rules of standard English or other standardized natural language. Much has been written in newspapers, books and blogs lamenting how America's young people are losing their ability to write in standard English because of the informal and compressed nature of their compositions intended for text communications and social media. Grammarians complain that texters are losing the ability to distinguish complete sentences from sentence fragments, to use proper punctuation and sentence structure, and to spell words correctly. For example, emoticons (which have no equivalent in a modern unabridged dictionary) have replaced words or phrases, abbreviations to create messages such as "Cn u undstd wat the stnce sys" and "idk" that replace full words or phrases with abbreviations. Additionally, certain words such as "definitely" are seemingly intentionally misspelled (e.g., as "definately") when texted from one teen texter to another. While many modern portable devices come with built-in spelling and grammar checking capabilities, users often deactivate such functions because they interfere with the ability to abbreviate and otherwise employ a non-standard texting vernacular.

Example non-limiting implementations herein can take advantage of such non-standard texting vernaculars by using dictionaries and/or other text transformation algorithms to create outputs that mimic the style of teenage texters. The average teenager's text message may be incomprehensible to an English professor (and to most other adult viewers) and yet may nevertheless be indistinguishable in style, grammar and usage from thousands of other text messages being sent by other teens. Example non-limiting implementations of the technology herein need not produce outputs that masquerade as "standard" English language usage as set forth say the Chicago Manual of Style, but could instead masquerade as a human text vernacular based on use of vernacular dictionaries such as Slee, "Text-tionary: The Ultimate Decoder of Text Abbreviations" (Authorhouse 2010); Crystal, "Txtng: The Gr8 Db8" (Oxford University Press 2008); and/or Baron, "Always On: Language In An Online and Mobile World" (Oxford University Press 2008), all incorporated herein by reference.

The decoding process is essentially the reverse of the encoding process. All punctuation is removed ensuring space is preserved between each word. A reverse dictionary is used to convert each word into its 8-bit binary equivalent base on its position within the dictionary. The resulting ciphertext string is then decrypted to retrieve the original plaintext string.

There are numerous advantages to the Dictionary Technique as follows:
  Table lookup is inherently fast both for encoding and decoding
  Dictionary size can be relatively small
  Dictionaries can be enterprise-specific and also group/subgroup specific providing the enterprise enormous flexibility in keeping access to sensitive messages restricted to only those members who have the proper dictionary installed
  Deletion of a dictionary in a particular user's mobile device essentially makes the stored ciphertext immediately unreadable
  Multiple dictionaries can be installed with the application and changed over time
  Automated scanning techniques would have to be more sophisticated to understand grammatical context, not just key word searching There are several additional improvements that can aid overall effectiveness of the Dictionary Technique:
  Dictionary words should be installed in random order.
  As shown spaces need to be inserted between words to provide for the appearance of sentence structure with random punctuation inserted such as commas and periods, etc.
  An initial random number for each message can be prepended to the initial dictionary index such that a random offset is added to the straight index to ensure that the dictionary conversion is different each time.
  Carefully choose the words in the dictionary to be 'distinct' from one another. If there is any loss of text or a few characters get corrupted, it's possible to recover the missing text if the words are generally distinct from one another.
  Dictionaries can be made up of different languages, character sets or alphabets.
  Dictionaries can include abbreviations and/or acronyms.
  Dictionaries can include content specific words that are normal for the participants such as medical terminology, etc.
  Dictionaries can include content specific words that are commonly used over a specific messaging medium such as SMS language (http://en.wikipedia.org/wiki/SMS_language)
  Dictionaries can include common misspellings of words.

To better illustrate one example non-limiting implementation, FIG. 1 shows an exemplary illustrative non-limiting end-user device 106 including, for example, a processor 502, a memory 504, and non-volatile storage 506. In the example shown, the processor 502 communicates with memory 504, and non-volatile storage 506 may also communicate with the processor either directly or through memory 504. The processor may communicate with the outside world via a wireless or wired communications adapter 508. A user may communicate with device 106 through a user interface provided for example by display or displays 510, input devices 512 and output devices 514. The display or displays 510 may comprise for example liquid crystal displays, plasma displays, rasterized displays, touch screens, or any other variation or other conventional display device. Input devices may include input keys, touch screen keys, push buttons, virtual buttons displayed on a touchscreen, a microphone for receiving voice activated commands, accelerometers or other motion detectors, light sensors (with or without pattern recognition capabilities), barcode readers, or any other device capable of conveying information to processor 502. Output devices 514 may include indicator lights, audio speakers, laser outputs, tactile output devices, printers, light projectors, feedback devices or any other output device desirable to provide a humanly perceivable or other output indicia.

In the example shown, the memory 504 may contain a variety of programs and data for manipulation and/or execution by processor 502. Non-volatile, non-transitory storage 506 (which in some exemplary or illustrative implementations may comprise a SIM card, SD card, magnetic disk, optical memory, flash memory, Disk, EPROM, PROM, SSD or any other non-volatile storage device) may supply programs including applications ("apps") to memory 504 for execution by processor 502. Storage or memory is used to maintain the data structures, messages and applications, and the processor executes the application from memory. For example, memory 504 in conjunction with non-volatile storage 506 may store data structures that link user identification information (e.g., telephone number, IP address, email address, name, other unique or non-unique identifier) with associated public keys or other material used for cryptographic operations. Any number of such records 602 may be stored in non-volatile storage 506 and/or memory 504.

Figure 1A:
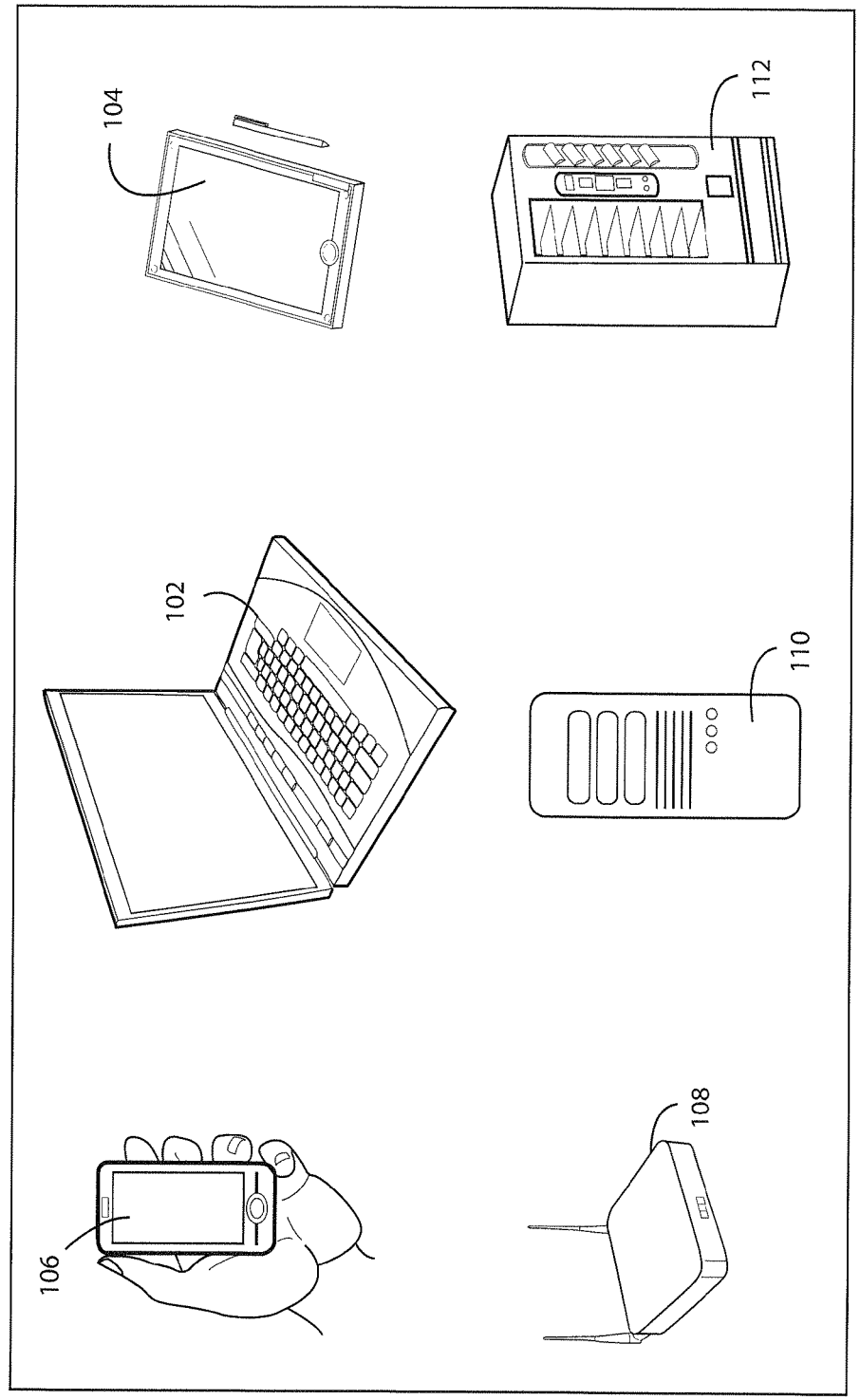
FIG. 1a shows example non-limiting user device form factors.

The form factor of device 106 can be any of a variety of different shapes and sizes such as shown in FIG. 1A, including for example wireless or wired laptop computers 102, tablet computers 104, personal digital assistants or cell phones 106, routers 108, or virtually any other kind of device. Any devices may have a need to communicate messages with any other device. Different user interface arrangements can be used for each of the different form factors of devices 106 as desired.

Figure 2:
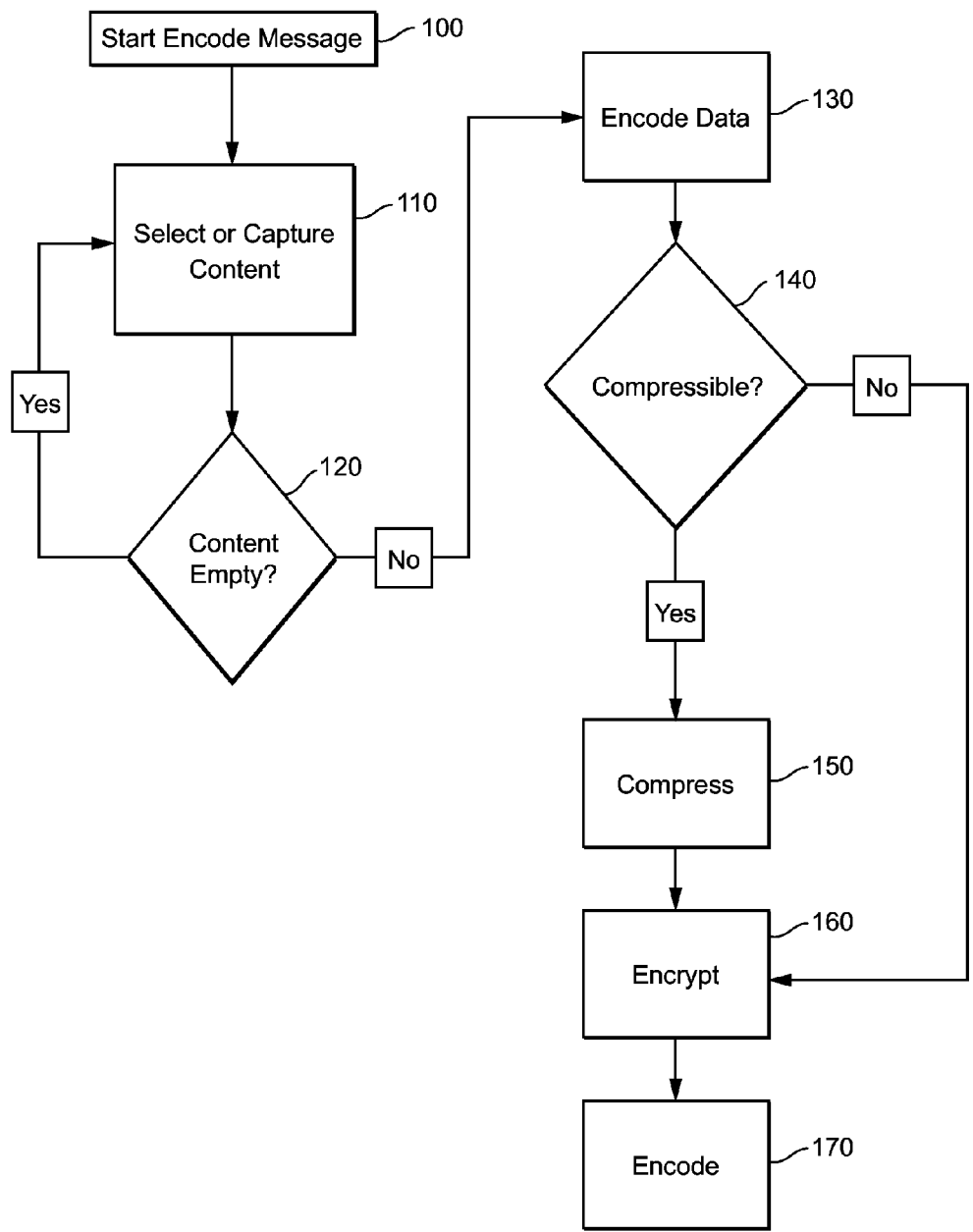
FIG. 2 shows a non-limiting exemplary flow chart of the high level steps used to encode content.

Referring to the non-limiting example FIG. 2 flow chart (which represents instructions stored in non-volatile and/or volatile storage 504, 506 and executed automatically by processor 502), a user or application begins the process of encoding electronic information. At step 100, the system has received a request to encode a message. Depending on the system, this may include selecting or capturing the content (step 110), including, but not limited to a video or audio clip, picture or image, file, other electronically renderable information, etc. Assuming the content is provided and not empty (step 120), the system proceeds to step 130 to begin the encoding process. As indicated in description above, some advanced systems may choose to compress content to reduce any expansion that may be caused during the encoding process. At step 140, if compression is enabled, the actual content may be analyzed to determine if it's compressible. If the input content is already in a highly compressed format including but not limited to as a jpeg or png, the compression process my actually expand the size of the content, thus the compression step may also be skipped as the system can proceed to step 160. Other transforms may also be present to reduce the content size. For example a jpeg image may be rerendered (lossful) to reduce the number of bits required to display the image, having the side effect of shrinking the size of the content. Other such reduction mechanisms can be easily envisioned by ones skilled in the art. If the content is compressible, the system proceeds to step 150 to reduce the size of the content before continuing to the encryption step 160. It is noteworthy to understand that in one non-limiting example, one should compress content prior to encrypting, as the output of a sound cryptographic function is a randomized data stream yielding less compressible data. In either case, once the content is present at step 160, it is ciphered into a stream of binary data. The output of step 160 is then fed into the dictionary encoding process at step 170. Upon completion of the dictionary encoding, the encoded content is returned to the requesting entity for further handling.

Figure 3:
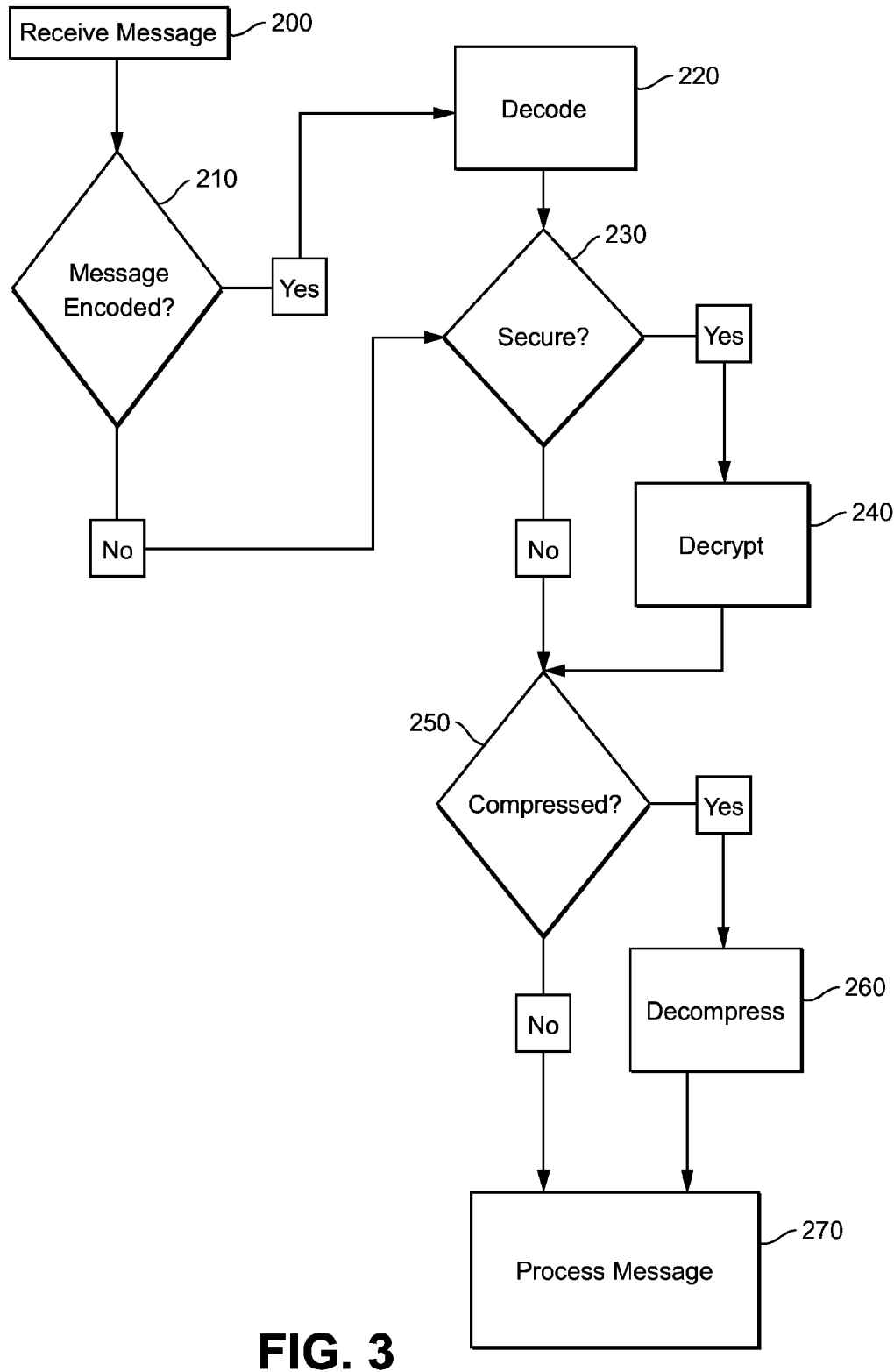
FIG. 3 shows a non-limiting exemplary flow chart of the high level steps used to decode content.

As previously indicated, decoding is the reversal of the encoding process. FIG. 3 provides a high level flow diagram of the decoding process (which represents instructions stored in non-volatile and/or volatile storage 504, 506 and executed automatically by processor 502). At step 200 the received content is passed to the decoding process to return the clear text content. At step 210, the system checks whether or not the content is encoded. If yes the encode content is passed to the dictionary decoder at step 220. To support legacy systems that do not support the encoding/decoding process, if the message is not encoded, the system may pass the content to step 230 to determine if it was secured through an encryption process. In either event, once the content is decode from step 220, or it was determined at step 210 that it wasn't encoded, the received content is processed by step 230 to determine if it was secured. If the content was in fact encrypted, the system proceeds to step 240 to decrypt the message, otherwise the system proceeds to step 250. The output of step 240 is also forwarded to step 250. The system now checks to see if the content was compressed. Based on the non-limiting list of reasons presented above for step 140, the content may or may not be compressed. If the content was compress the system proceeds to step 260 to decompress the data back into its original representation and proceeds to step 270. If the content was not compressed, or merely just rerendered, the system proceeds from step 250 directly to step 270 as the output of the security analyses step 230 and decryption process 240 may be the clear text representation of the content provided. This output is then returned to the calling entity for further handling.

Figure 4:
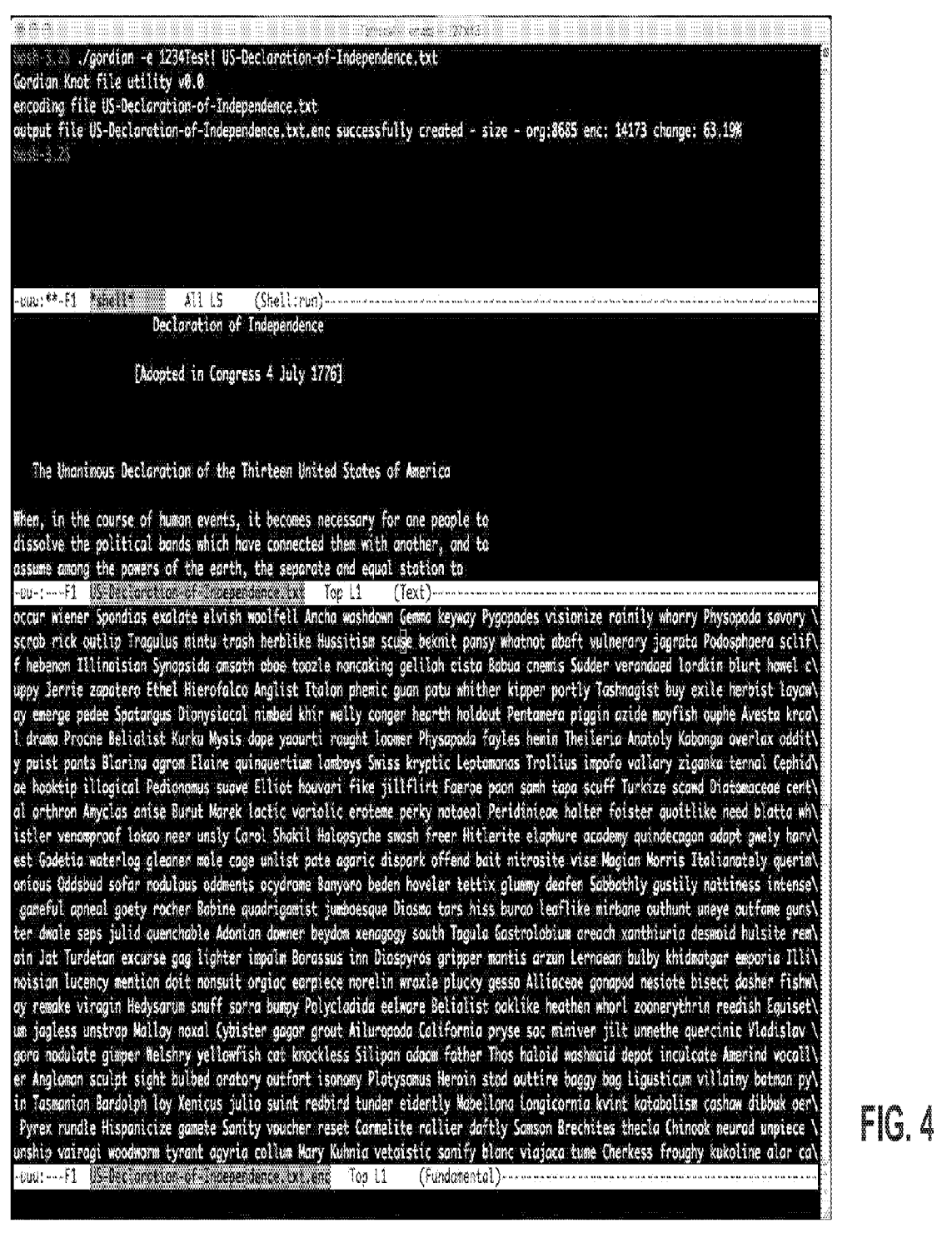
Figure 5:
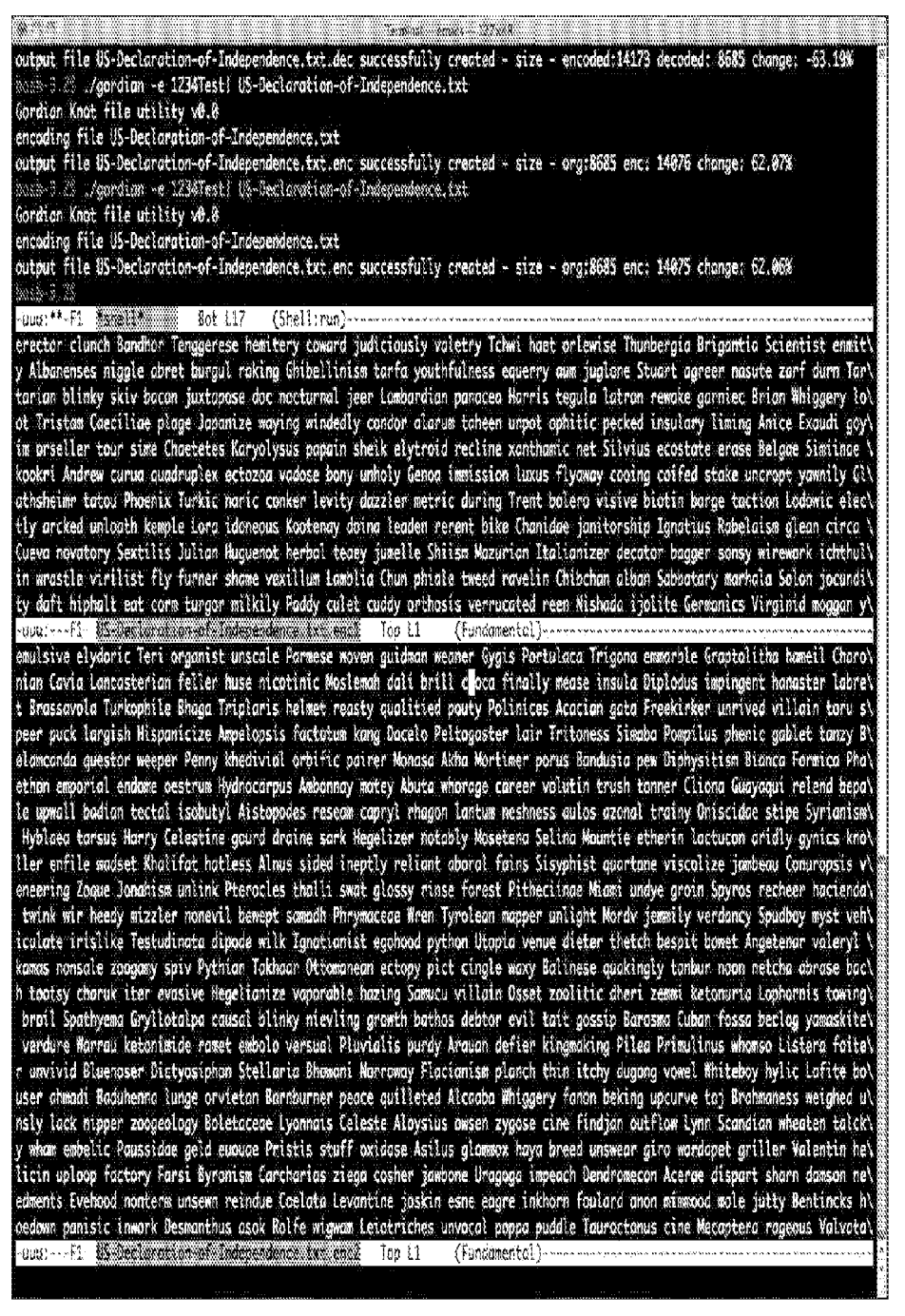

To present a clearer understanding of the capabilities of example non-limiting implementations, FIGS. 4, 5, and 6 provide screen shots of a command line computer program that depicts a non-limiting illustrative embodiment of the encoding and decoding. FIG. 4 is broken up into three separate areas, each delimited by a horizontal status bar. In area 1 of FIG. 4 is a window to an active command line shell on a non-limiting representative Unix-derivative base system. It is to be appreciated that this exemplary command line computer program could execute in other environments as well. Area 2 of FIG. 4 is a display of the clear text content, in this non-limiting example, an electronic representation of the US Declaration of Independence. Area 3 of Figure for is the output of the supplied content after being processed by the encoding system. Clearly the displayed output in area 3, other than containing English words and the output file name, has little if any visible correlation to the original content displayed in area 2 of FIG. 4.

FIG. 5 is a similar representation as FIG. 4, however the encoding process was invoked a second time on the original content. In this non-limiting illustrative example, the screenshot is again broken into 3 areas delimited by a horizontal status bar. Area 1 is again displaying the command line shell. In this area you can see that the non-limiting exemplary computer program was invoked for a second time. Unlike FIG. 4, area 2 and area 3 show the output of each separate invocation. When comparing area 2 to area 3, other than the filenames being similar, the output content is decisively different. This could be due to a multitude of reasons, including, but not limited to the use of different dictionaries on each invocation, the randomized output of the encryption process, the order of the words in a dictionary are randomized, etc. In any case, the output content may be different even for the same input content on each invocation, further shielding the original content.

FIG. 6 is a similar representation as FIG. 4, however the screenshot depicts the decoding process. As with FIGS. 4 and 5, FIG. 6 is similarly broken up into 3 areas delimited by a horizontal status bar. The top area is again displaying the command line shell. In this area you can see that the non-limiting exemplary computer program was invoked once to encode the content and then was invoked a second time to decode the encoded output back to its original representation. Area 2 shows the encoded output of this process, and area 3 shows the decoded content. In this non-limiting exemplary embodiment, filename extensions have been added by the computer program (.enc and .dec as depicted in the area's status bar) to delineate between the encoding and decoding process. Area 3 of FIG. 6 shows the original content of the US declaration of Independence after being run through the encoding and decoding process.

Figure 7:
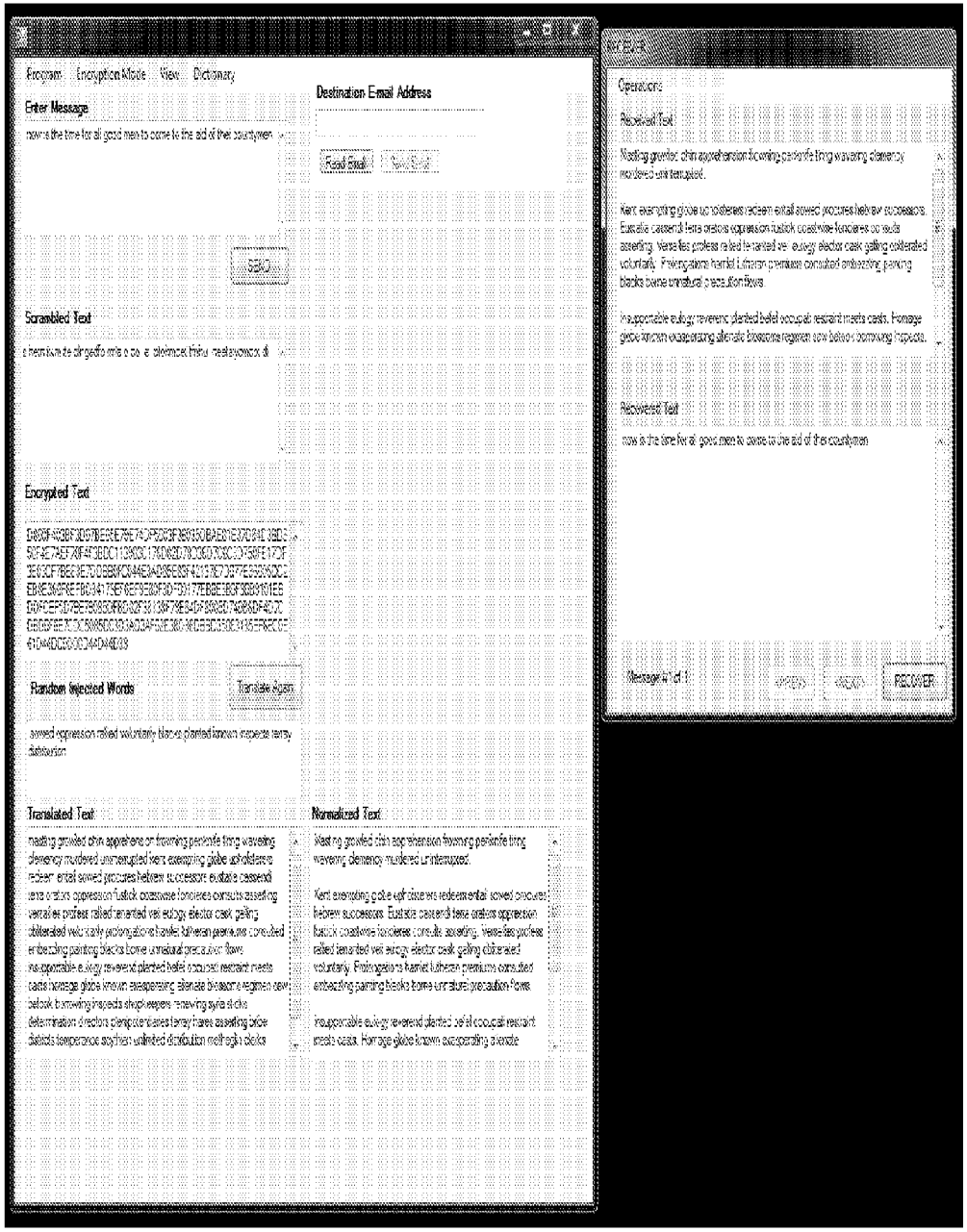
FIG. 7 shows a non-limiting exemplary computer application that encodes electronic information employing additional grammatical syntax to further obfuscate content.

FIG. 7 shows a screenshot of a non-limiting exemplary computer application that depicts the encoding and decoding processes that employ additional grammatical syntax capabilities. FIG. 7 is broken into two windows, one showing the encoding process on the left, and one showing the decoding process on the right (receiver). Looking at the encoding process window, the top pane allows a user to enter a textual message to be communicated to a peer via email or other messaging facility. In this case, the user entered the familiar phrase:

"now is the time for all good men to come to the aid of their countrymen."

In the second window, the illustrative embodiment scrambles the order of the original content top further obfuscate the message prior to the encryption process. This may help ensure that the output of the encryption process is unique for each message. The content is then passed onto the encryption module to create the encrypted text output as depicted in the third window. For the sake of readability within the illustrative embodiment, the binary encrypted output is displayed as a stream of ascii encoded hexadecimal digits. The binary output is then passed onto the encoding process along with a list of randomly selected words that may not be part of the selected encoding dictionary. The binary content is then converted and combined with the randomized words into a stream of output word content as depicted in the bottom left pane of translated text. The addition of the randomly selected words further obfuscates the content as a nefarious party would have to determine which words is part of the message that represents the encrypted content. Once the encoded stream is created, the content goes through the grammatical processing to further normalize the text, as depicted in the bottom right pane of encoding process. In this non-limiting illustrative embodiment the grammatical process capitalized words, adds punctuation and line ending codes, to make the text appear as "normal" unencoded textual content. In reality the textual representation makes little sense to either the casual observer or more stringent search methods. The output text:

Masting growled chin apprehension frowning penknife timing wavering clemency murdered uninterrupted . . . "
bears little resemblance to the original message entered by the user.

Focusing on the upper right quadrant of FIG. 7 depicts the non-limiting illustrative embodiment of the decoding (receiver) process. The upper pane shows that the receiver, whether through email or some alternate method of receiving the electronic information, processes the normalized content output by the encoding process. By selecting the recover button, the original textual message entered by the user is displayed in the bottom right window of the decode process, reversing the steps used during the encoding process.

Figure 8:
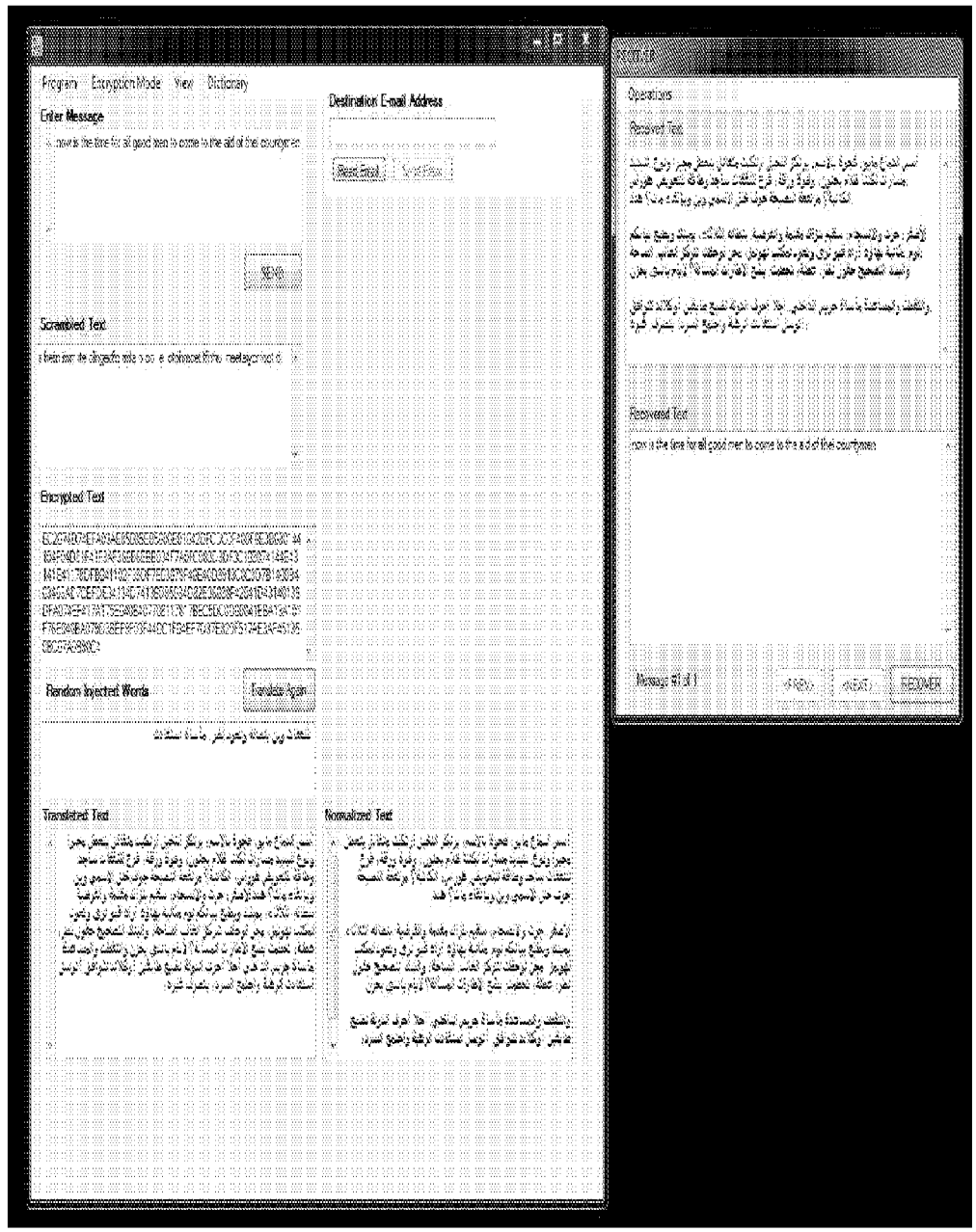
FIG. 8 shows a non-limiting exemplary computer application that encodes electronic information with additional languages and alphabets support.

FIG. 8 further depicts a non-limiting exemplary embodiment not only using additional grammatical syntax, but also different languages and alphabets. Similar to FIG. 7, the same original content was entered into the non-limiting illustrative application. In this exemplary embodiment, the user requested that the output content be encoded in Farsi using the Arabic alphabet, instead of English. As you can see from the decoded content on the right, the original text was writing in English and is recovered in English, even though the encoded content was represented as Farsi verbiage.

Alternative encoding could also enhance the obfuscation process. Given natural linguistic characteristics, systems can be designed to follow standard sentence structure, where the output follows algorithms to build complete sentences where parts of speech are used in a deterministic way. As a non-limiting illustrative example, a sentence may start with a proper noun, followed by an adverb or adjective, follow by a verb, etc. Other parts of speech such as prepositions, conjunctions, etc. would also be in interspersed appropriately. The natural sentence structure of a given language would make it even more difficult to detect encoded information using traditional grammatical checks algorithms.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method for providing security in an electronic messaging system comprising:
   receiving a message input;
   using a processor, encoding said message input to provide ciphertext;
   with said processor, further transforming said ciphertext to disguise the ciphertext and make it appear to be similar to or indistinguishable from, at least by certain automated processes, a natural language short message; and
   transmitting said further-transformed ciphertext as a short message over an electronic network using a short-messaging protocol.

2. The method according to claim 1, wherein said short-messaging protocol comprises SMS and said further transforming uses an SMS language dictionary containing words commonly exchanged over SMS.

3. The method according to claim 1, wherein said further transforming comprises using a word dictionary to substitute natural language words for incomprehensible ciphertext elements.

4. The method according to claim 3, further comprising using a table look-up of a word from the dictionary using a dictionary table comprising randomly chosen words, and wherein the dictionary table is shared by a sender and a receiver.

5. The method according to claim 3, wherein said further transforming comprises using enciphered characters as an index into a dictionary table.

6. The method according to claim 3, further comprising automatically, with the processor, generating individual sentence parameters including a number of words to a sentence, where to insert punctuation marks, and other characteristics in order to make the transformed ciphertext appear as at least one natural language short message.

7. The method of claim 1 wherein the further transforming uses a dictionary that includes alternate spellings of the same natural language words.

8. The method of claim 1 wherein the further transforming uses a text vernacular dictionary to transform the ciphertext to mimic the style of a human texting vernacular.

9. A system for providing security in electronic messaging comprising:
   an input device that receives a message input;
   a processor configured to encode said message input to provide ciphertext, to further transform said ciphertext to disguise the ciphertext and make it appear to be similar to or indistinguishable from, at least by certain automated processes, a natural language short message; and
   a message transmitter that transmits said further-transformed ciphertext as a short message over an electronic network using a short-messaging protocol.

10. The system according to claim 9, wherein said short-messaging protocol comprises SMS.

11. The system according to claim 9, wherein said further transforming comprises using a word dictionary to substitute natural language words for incomprehensible ciphertext elements.

12. The system according to claim 11, further comprising using a table look-up of a word from the dictionary using a dictionary table comprising randomly chosen words, and wherein the dictionary table is shared by a sender and a receiver.

13. The system according to claim 9, wherein said further transforming comprises using enciphered characters as an index into a dictionary table.

14. The system according to claim 9, wherein the processor is further configured to generate individual sentence parameters including a number of words to a sentence, where to insert punctuation marks, and other characteristics in order to make the transformed ciphertext appear as natural language of at least one short message.

15. The system of claim 9 wherein the processor is coupled to a dictionary that includes alternate spellings of the same natural language words, and the processor transforms said ciphertext using the dictionary.

16. The system of claim 9 wherein the processor is coupled to a text vernacular dictionary, and the processor transforms said ciphertext to mimic the style of a human texting vernacular using the text vernacular dictionary.

17. A non-transitory storage device storing instructions which when executed by a processor improves security of an electronic messaging system, the instructions comprising:
   First instructions for receiving a message input;
   Second instructions for encoding said message input to provide ciphertext;
   Third instructions for further transforming said ciphertext to disguise the ciphertext and make it appear to be similar to or indistinguishable from, at least by certain automated processes, from a natural language short message; and
   Fourth instructions for transmitting said further-transformed ciphertext as a short message over an electronic network using a short-messaging protocol.

18. The storage device of claim 17 wherein the natural language short message is no more than 140 characters long and is written in the style of a text message.

19. The device of claim 17 wherein the third instructions use a dictionary that includes alternate spellings of the same natural language words.

20. The device of claim 17 wherein the third instructions use a text vernacular dictionary to transform said ciphertext to mimic the style of a human texting vernacular.

* * * * *